A. DOBLE.
ELECTRIC AUXILIARY SYSTEM FOR STEAM AUTOMOBILES.
APPLICATION FILED APR. 10, 1912.
1,266,229. Patented May 14, 1918.
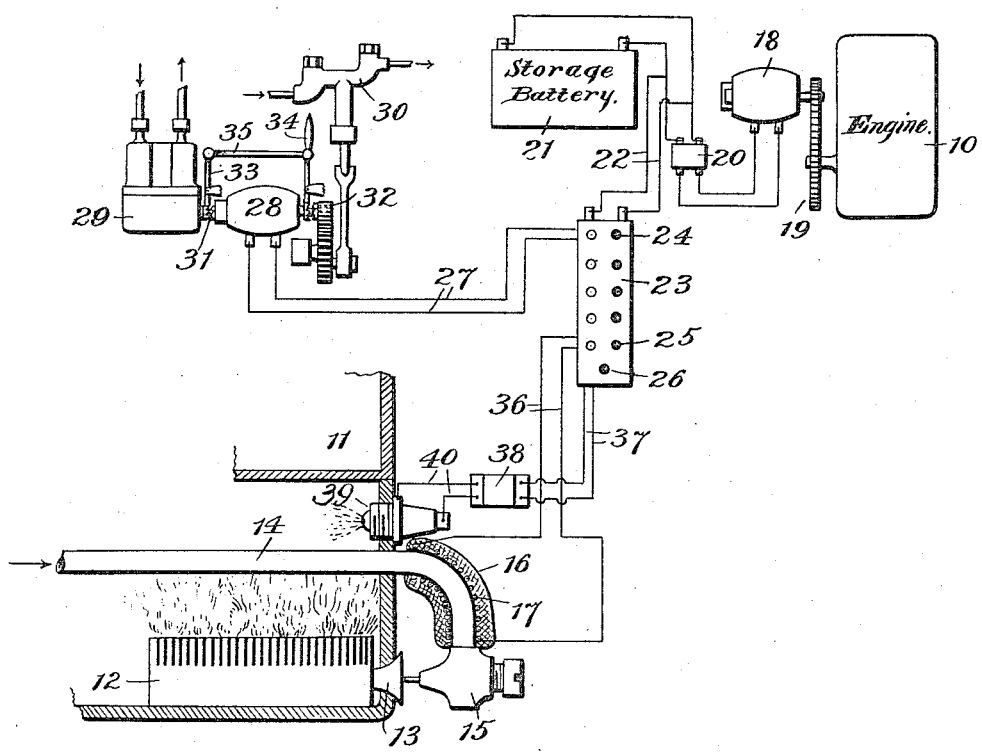

UNITED STATES PATENT OFFICE.

ABNER DOBLE, OF BROOKLINE, MASSACHUSETTS, ASSIGNOR, BY MESNE ASSIGNMENTS, TO DOBLE-DETROIT STEAM MOTORS CO., OF DETROIT, MICHIGAN, A CORPORATION OF DELAWARE.

ELECTRIC AUXILIARY SYSTEM FOR STEAM-AUTOMOBILES.

1,266,229.

Specification of Letters Patent.

Patented May 14, 1918.

Application filed April 10, 1912. Serial No. 689,862.

*To all whom it may concern:*

Be it known that I, ABNER DOBLE, a citizen of the United States, residing at Brookline, county of Norfolk, State of Massachusetts, have invented certain new and useful Improvements in Electric Auxiliary Systems for Steam-Automobiles, of which the following is a specification.

This invention relates to electric auxiliary systems for steam automobiles for the purpose of supplying electricity for the usual lamps of the vehicle, for driving pumps, and for vaporizing and igniting the fuel for the steam generator.

The invention is diagrammatically illustrated in the accompanying drawing, in which 10 indicates the engine for driving the vehicle and 11 a portion of the steam boiler, the latter being provided with a burner 12 of any suitable construction. The burner is provided with a suitable mixing tube 13 which is supplied with fuel through a pipe 14 having a valve 15 therein. As shown the pipe 14 extends through the boiler above the burner and outside of the boiler casing is preferably surrounded by a heating coil 17, which is suitably insulated from the pipe and surrounded by a heat-insulating material 16. The purpose of this coil is to so heat the pipe 14 and the fuel therein as to cause the fuel to more readily vaporize.

The dynamo 18 is mounted on the vehicle and driven from the engine 10 by means of the silent chain 19, or any other suitable driving mechanism. An automatic cut-out 20 receives current from the dynamo 18 and supplies the storage battery 21. The cut-out 20 may be of any of the usual commercial types which are adapted to open the circuit between the dynamo and the storage battery whenever the speed of the dynamo is below that sufficient to generate the voltage required for charging the storage battery. A supply circuit 22 is connected between the cut-out 20 and the storage battery 21 and supplies the distributing switchboard 23. This switchboard is provided with suitable switches 24, 25 and 26 and also with such additional switches as may be desired to control the different circuits with which the vehicle is equipped. The switch 24 supplies the circuit 27 which operates a motor 28, this motor being arranged to drive the air pump 29 and the water pump 30. In order to throw these pumps into and out of operation I provide suitable clutches 31 and 32 which are operated by the levers 33 and 34 respectively. In order to operate these levers simultaneously so as to throw out one of the pumps when the other is thrown into operation the levers 33 and 34 are connected by means of a link 35.

The air pump may be used for supplying air to the tires of the vehicle or for the purpose of cleaning the latter. The water pump may be used to supply water to the boiler.

A circuit 36 controlled by the switch 25 leads to the heating coil 17. A circuit 37 controlled by the switch 26 leads to the primary of an induction coil 38, the secondary of which is connected with a spark plug 39 by means of the circuit 40.

It will be seen that by the above construction the storage battery will be charged by means of the dynamo 18 driven by the engine of the vehicle and current may be drawn from the storage battery or dynamo to supply the different circuits of the vehicle. The heating coil 17 and the spark plug 39 are of especial convenience as current may be taken from the storage battery when the vehicle is not running and supplied to the heating coil 17 to vaporize the fuel and to start the boiler, the spark plug being employed to ignite the vapor emitted by the burner. The switchboard 23 will be located in any convenient place on the vehicle, such as on the dashboard thereof, so that the switches may be readily manipulated by the operator when he is in the usual position in the vehicle.

Having thus described the invention what I claim as new and desire to secure by Letters Patent is:

A steam boiler for motor vehicles having a fuel burner, a fuel supply pipe for the burner extending through the boiler above the said burner and having a portion outside the boiler leading to the burner, an electric heating coil surrounding said portion of the pipe, and a spark plug associated with the burner adapted to ignite the fuel discharged therefrom.

In testimony whereof I affix my signature in presence of two witnesses.

ABNER DOBLE.

Witnesses:
 AGNES G. KILLION,
 STEPHEN E. BURKE.